(12) United States Patent
Schneid

(10) Patent No.: US 8,591,977 B2
(45) Date of Patent: Nov. 26, 2013

(54) METHOD FOR FILTERING BEER

(75) Inventor: Ralf Schneid, Freising (DE)

(73) Assignee: Krones AG, Neutraubling (DE)

( * ) Notice: Subject to any disclaimer, the term of this patent is extended or adjusted under 35 U.S.C. 154(b) by 294 days.

(21) Appl. No.: 12/532,569

(22) PCT Filed: Jan. 31, 2008

(86) PCT No.: PCT/EP2008/000792
§ 371 (c)(1),
(2), (4) Date: Nov. 12, 2009

(87) PCT Pub. No.: WO2008/119408
PCT Pub. Date: Oct. 9, 2008

(65) Prior Publication Data
US 2010/0062104 A1 Mar. 11, 2010

(30) Foreign Application Priority Data

Mar. 30, 2007 (EP) .................................. 07006716

(51) Int. Cl.
*A23C 3/00* (2006.01)
(52) U.S. Cl.
USPC .......... 426/238; 426/330.4; 426/11; 426/405; 426/519
(58) Field of Classification Search
USPC ................ 426/330.4, 11, 422, 405, 519, 238
See application file for complete search history.

(56) References Cited

U.S. PATENT DOCUMENTS

| 2,316,241 | A |   | 4/1943 | Heimann et al. |
| 2,992,110 | A | * | 7/1961 | Haas .............................. 426/11 |
| 4,324,810 | A | * | 4/1982 | Goldstein et al. ............. 426/600 |
| 4,636,394 | A | * | 1/1987 | Hsu .............................. 426/330.4 |
| 5,586,492 | A | * | 12/1996 | Graef .............................. 99/516 |
| 5,801,051 | A |   | 9/1998 | Kiefer et al. |
| 6,309,685 | B1 | * | 10/2001 | Kozari et al. .................. 426/238 |
| 6,605,252 | B2 | * | 8/2003 | Omasa ............................ 422/20 |

FOREIGN PATENT DOCUMENTS

| DE | 682788 | C |   | 10/1939 |   |
| DE | 1160812 | B |   | 1/1964 |   |
| DE | 4327678 | A1 |   | 2/1995 |   |
| DE | 10026723 | A1 |   | 12/2001 |   |
| DE | 102005058458 | B3 |   | 2/2007 |   |
| GB | 586996 | A |   | 4/1947 |   |
| JP | 2001-504705 | A |   | 4/2001 |   |
| JP | 2005151818 | A |   | 6/2005 |   |
| JP | 2008206446 | A |   | 9/2008 |   |
| RU | 1995111271 | C1 |   | 12/1998 |   |
| RU | 2143486 | C1 |   | 12/1999 |   |
| WO | WO9119780 |   | * | 12/1991 | .............. C12H 1/04 |
| WO | WO-9119780 | A1 |   | 12/1991 |   |
| WO | WO 9823724 |   |   | 6/1998 |   |

OTHER PUBLICATIONS

International Search for International Patent Application No. PCT/EP2008/000792.
Japanese Office Action for P 2010-500090 mailed Aug. 9, 2011.

* cited by examiner

*Primary Examiner* — Drew Becker
*Assistant Examiner* — Preston Smith
(74) *Attorney, Agent, or Firm* — Marshall, Gerstein & Borun LLP

(57) ABSTRACT

A method for filtering beer, wherein the beer to be produced is guided into a filter. For the improvement of the filtering output, the beer to be produced is subjected to a shaking process before being introduced into the filter.

13 Claims, 3 Drawing Sheets ously, the filter has to be cleaned so that no residues remain. Especially with beer, which contains polysacchaoses and proteins, such as beta glucan, for example, precoating gets more difficult, so that a lot of filter aid has to be used, which gets clogged very quickly however.

METHOD FOR FILTERING BEER

CROSS-REFERENCE TO RELATED APPLICATION

The present application claims the benefit of priority of International Patent Application No. PCT/EP2008/000792 filed on Jan. 31, 2008, which application claims priority of European Patent Application No. 07006716.0 filed Mar. 30, 2007. The entire text of the priority application is incorporated herein by reference in its entirety.

FIELD OF THE DISCLOSURE

The present disclosure relates to a method for filtering beer, where the beer to be produced is guided into a filter as nonfiltrate.

BACKGROUND

In the production of beer, yeast cells and other solids or ingredients are separated off by filtration to guarantee a given durability of the beer and to not cause any subsequent turbidity. Up to now, the beer has been mainly filtered by means of precoat filters, e.g. by means of filter cartridges. With such precoat filters, kieselguhr (diatomite) has been mainly used as filter aid up to now. Due to the toxicity of diatomite as well as the problems of disposing of the same, one is trying to minimize the employment of diatomite or to find alternatives to this technology. For example, membrane filters offer one alternative, however, they only have a smaller filter capacity and moreover get clogged very quickly.

SUMMARY OF THE DISCLOSURE

Starting from this, an object underlying the present disclosure is to provide an improved method for filtering beer that prevents quick clogging of a filter and can reduce the required amount of filter aids in precoat filters.

By subjecting the beer to be produced to the shaking process before it is introduced into the filter, for example the portion of polysaccharoses and proteins, such as beta glucan, is reduced, having an advantageous effect on filtration. By the shaking process, in particular the pressure increase between the filter inlet and filter outlet is reduced thereby, meaning that the filter does not get clogged so quickly and thus does not have to be cleaned and precoated with filter aids so often. In precoat filters, the amount of required filter aids can be essentially reduced. In this application, the "beer to be produced" is intended to mean the already fermented beer, or else beer precursors, such as the wort.

The method according to the disclosure moreover permits a high volume flow rate or a higher total filtration amount through the filter.

According to a preferred embodiment, during the shaking process, the beer to be produced is introduced into a container where vibrations can be generated by means of a vibration element. In the process, the vibration element can be, for example, mechanically moved to and fro while it is shaking, or it can be deformed electromechanically, so that vibrations are formed in the liquid.

Preferably, the vibration frequency f(t) of the vibration element is modulated within a range between a lower frequency fmin and an upper frequency fmax.

It showed that, if the frequency is modulated between a lower and an upper frequency value, the method can be carried out especially effectively and the filtering output is particularly high. Preferably, the vibration frequency f(t) is modulated sinusoidally.

The vibration frequency f(t) can be modulated with a phase duration within a range of 0.1 to 5 minutes, and preferably 1 to 3 minutes. Such an excitation of the beer to be produced proved to be particularly advantageous.

The frequency range is in this case preferably within a total range of between 30 and 220 Hz. Just in this low frequency range, improved filtration surprisingly showed. According to a preferred embodiment, the lower frequency is 90 Hz, and the upper frequency is 120 Hz. The difference between the upper and the lower frequency is in this case preferably 10 to 50 Hz.

According to a preferred embodiment, the nonfiltrate is filtered through a precoat filter, preferably a filter cartridge or a membrane filter. Such filters are in particular suited for the filtration of beer for beer clarification and permit to filter out particles within a range of 10-1 to 10-2 µm, so that even yeasts having a particle size of about 5 to 10 µm can be reliably filtered out.

According to a preferred embodiment, beer as nonfiltrate is filtered after the fermentation and storage processes for beer clarification.

Preferably, the unfiltered beer is subjected to the shaking process already during the brewing house process, i.e. during the production of the wort before the fermentation process, or else after the brewing house process, i.e. after or possibly during the fermentation and storage processes.

The beer to be produced is preferably excited via at least two, preferably three or four vibration elements, which proved to be particularly advantageous.

BRIEF DESCRIPTION OF THE DRAWINGS

The present disclosure will be illustrated below in greater detail with reference to the following figures.

DETAILED DESCRIPTION

Figure 1:
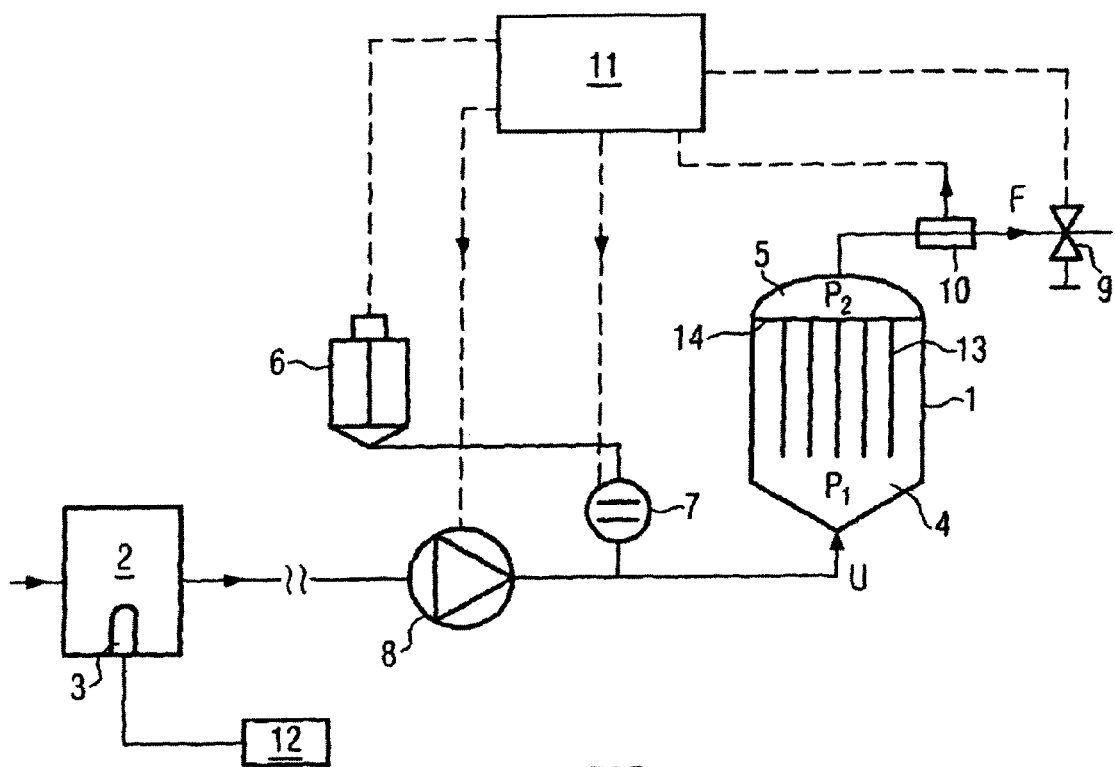
FIG. 1 schematically shows the design of a filter device for performing the method according to the disclosure.

FIG. 1 shows a possible device for carrying out the method according to the disclosure, the method here being described in connection with a filter cartridge 1. However, the present disclosure is not restricted to the use of a filter cartridge, but it is just as well suited for the use of a different microfilter, such as for example a membrane filter.

As can be taken from FIG. 1, the filter cartridge 1 comprises, as is well-known, several filter cartridges arranged vertically in the nonfiltrate chamber 4, the filter cartridges here being, for example, arranged at a separating plate 14, the filtrate chamber 5 being located above the nonfiltrate chamber 4 and the separating plate 14. During the filtration in a filter cartridge, filter aid is flushed to the surfaces of the hollow filter cartridges 13, where the nonfiltrate passes through the precoated layer and the filter cartridges, is guided through the filter cartridges 13 into the nonfiltrate chamber 5 and leaves the filter from there as filtrate F. For the filtration in precoat filters, an appropriate amount of filter aid, for example diatomite, must be added by metering by means of a metering device 6 and a metering pump 7. The arrangement furthermore comprises a nonfiltrate pump 8 for pumping in the nonfiltrate into the filter vessel. Furthermore, the device comprises a control valve 9 for adjusting the volume flow rate of the filtrate F as well as optionally a flow meter 10 for measuring the volume flow rate of the filtrate. The device includes a system control 11, which is here, for example, connected to the nonfiltrate pump 8, the metering device 6, the metering pump 7, the control valve 9 and the flow meter 10. In beer production, after the brewing house process, during which the wort is produced in a known manner, and after the fermentation, microfiltration can be performed, so that yeast cells and other solids contained in the beer can be removed. Such substances can be filtered out, so that they do not make the beer turbid. As the yeast has a particle size of about 5 to 10 μm, it is necessary to use the above-mentioned microfilter.

According to the present disclosure, a container 2 is provided upstream of the filter 1, in which waves can be generated mechanically by means of a vibration element 3. In this example, the vibration element 3 is now embodied as vibration rod arranged at the lower end within the container 2. Naturally, several vibration elements can also be provided. These can also be arranged at other points within the container. It is only essential for the beer to be produced, i.e. the later nonfiltrate, to be vibrated via the vibration element. In the process, the vibration element 3 can be e.g. move to and fro while it is shaking (for example like in a concrete mixer). The vibration element 3, however, can also be electromechanically deformable. Due to the vibration element 3, vibrations are propagated in the container 2. It is also possible for the vibration element to push against the container from outside. The vibration element 3 can be activated by means of a control unit 12 that controls the rating of the vibration element as well as the frequency response curve.

Figure 2:
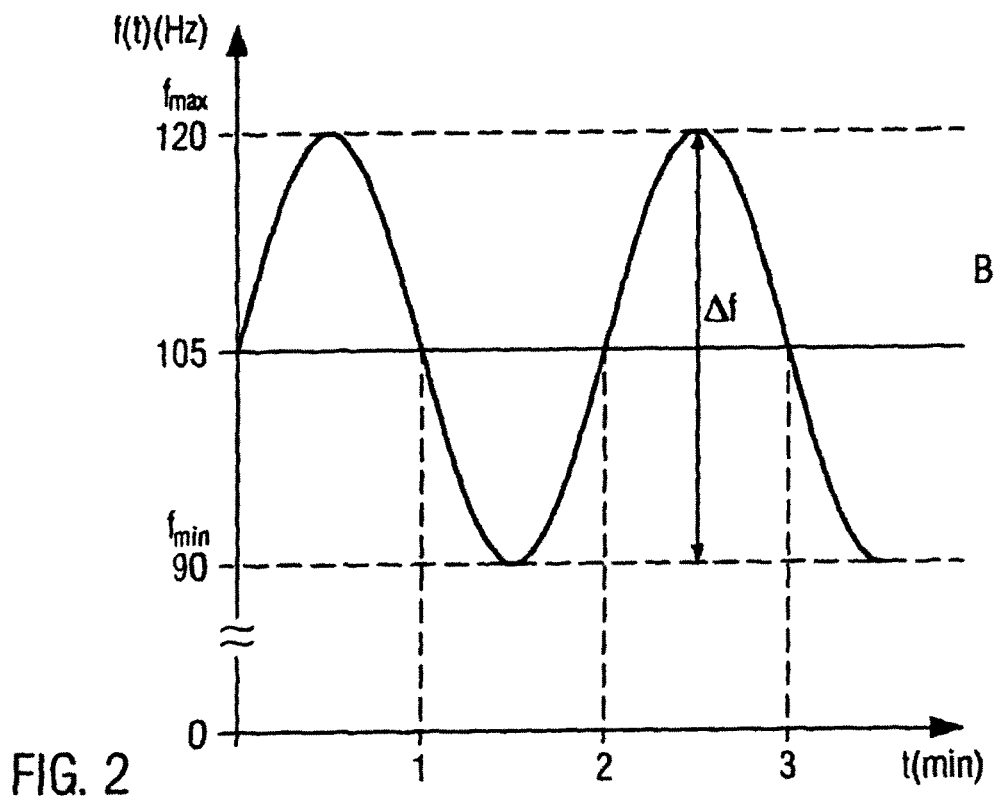
FIG. 2 schematically shows the course of the modulated vibration frequency f(t).

Below, the method according to the disclosure will be illustrated more in detail with reference to FIGS. 1 to 3.

The beer to be produced is first guided into the container 2 before the filtration, the container comprising the above-mentioned vibration element 3. The container 2 has, for example, a capacity of 50 hl to 1000 hl. In the container 2, the beer to be produced is subjected to a shaking process. The shaking process can be performed, for example, during the brewing house process for producing the wort, i.e. still before fermentation. In the process, the beer to be produced or the wort, respectively, is vibrated by means of the vibration element 3. The shaking process lasts about 5 to 60 minutes. The rating of the vibration element 3 is within a range of 0.1 to 3 KW.

Figure 3:
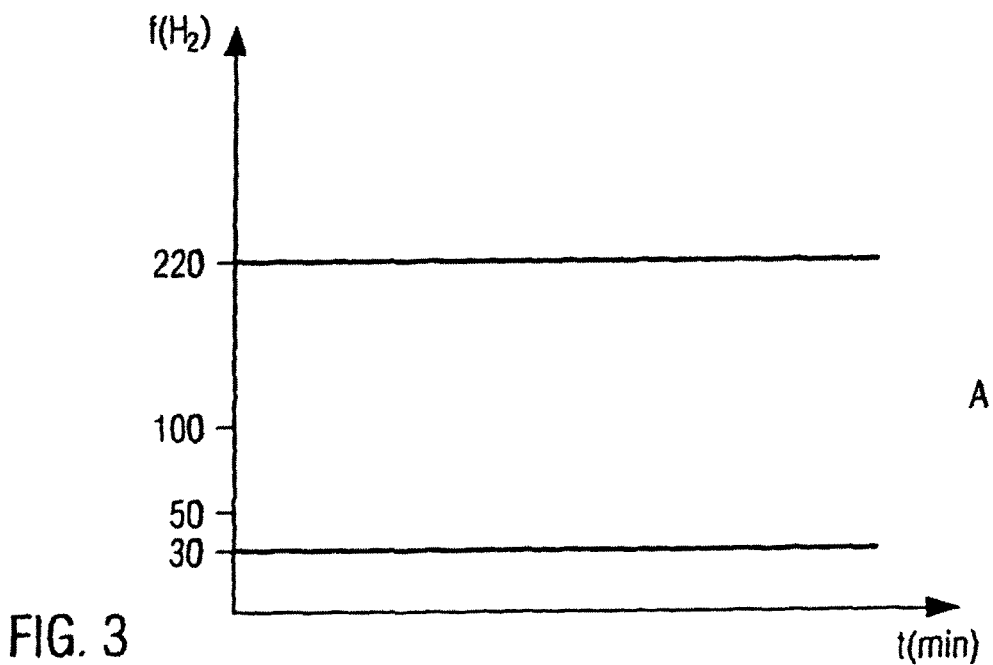
FIG. 3 shows the possible total frequency range A within which the frequency range B can be situated.

It showed that the frequency f(t) should be within a low-frequency range, for example within a range of between 30 and 220 Hz, as can be taken from FIG. 3. It furthermore showed that it is particularly advantageous for the vibration frequency f(t) of the vibration element 3 to be modulated within a frequency range B between a lower frequency fmin and an upper frequency fmax, as can be seen for example in FIG. 2. In FIG. 2, the frequency is modulated sinusoidally within a range of about 90 Hz to 120 Hz with a phase duration of 2 minutes. The difference Δf between fmin and fmax here is 30 Hz. Such an excitation proved to be particularly advantageous and unexpectedly appears to facilitate the reduction of proteins and polysaccharoses. Of course, the frequency response curve of the vibrations is not restricted to the concrete embodiment shown in FIG. 2. The phase duration can be, for example, within a range of 0.1 to 5 minutes, preferably within a range of 1 to 3 minutes. The frequency range B (in which the frequency changes in response to time) between the lower frequency fmin and the upper frequency fmax can be situated within the total range A shown in FIG. 3, i.e. between 30 and 220 Hz, where Δf can be between 10 and 50 Hz.

The excitation can be either performed continuously or else intermittently.

After the shaking process, the beer to be produced is guided out of the container 2 and then possibly to subsequent devices for the production of wort, after which the beer to be produced, that means the wort, is fermented.

After the fermentation process, the beer to be produced, that means the nonfiltrate U, is then pumped into the filter 1 via the pump 8, where the nonfiltrate U, that means the beer to be produced, is filtered in a known manner while filter aids, e.g. kieselguhr (diatomite), are being added. However, the shaking process could also take place directly before filtration, i.e. after fermentation and storage, or during the same.

By having subjected the nonfiltrate, i.e. the beer to be produced, to a shaking process before filtration, essential advantages result for the filtration. For example, the pressure between the filtrate and the nonfiltrate sides, ΔP=P1−P2, does not increase as much as in prior art, so that a better filtering output, that means a longer filtration time, can be realized. The filter altogether does not get clogged so quickly, so that the frequency of filter cleaning can be reduced. Furthermore, less diatomite, i.e. filter aid, must be added. This is especially advantageous in particular with respect to the toxicity and the problems of disposing of the diatomite. Even if a different microfilter, such as, for example, a membrane filter, is used instead of the filter cartridge 1, where no metered addition of filter aids is required, there is the advantage of the membrane filter not getting clogged so quickly. The transmembrane pressure difference can thus be essentially reduced.

Figure 4:
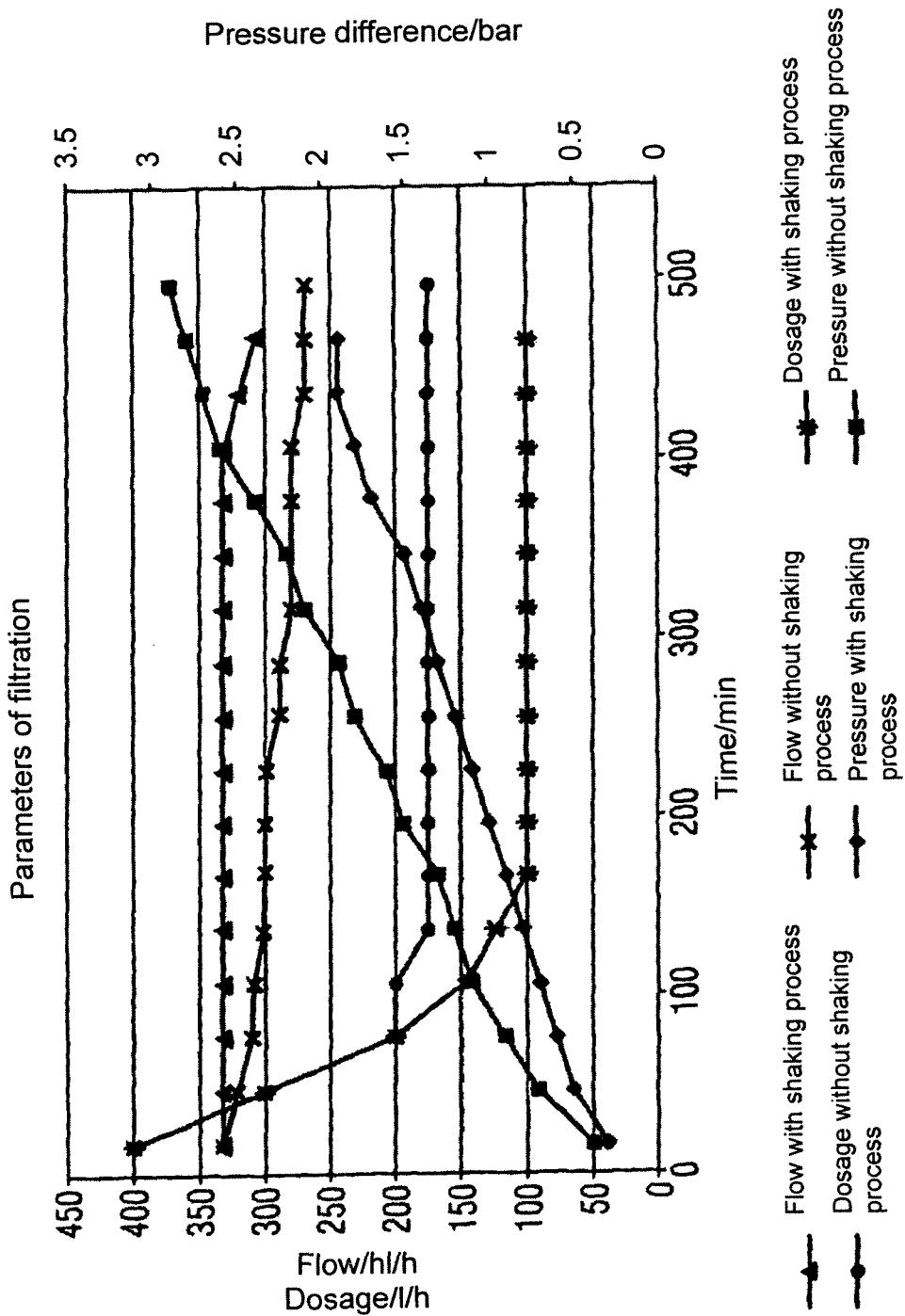
FIG. 4 shows the filter parameters of a comparison measurement between a filtration with and one without a shaking process.

In connection with FIG. 4, a filtration according to the present disclosure, where the nonfiltrate has been subjected to a shaking process during its production, is compared to a conventional filter method.

The comparison filter tests were carried out with beers from one malt batch. A fermentation tank was filled with a standard brew that had not been subjected to a shaking process. Another fermentation tank was filled with a brew that had been shaken and vibrated during the brewing house process. The frequency modulated sinusoidally between 90 and 120 Hz within a phase duration of 2 minutes, as was illustrated in connection with FIG. 2 in greater detail.

For the filtration, a standard Twinflow type filter cartridge of the company Steinecker was used. For examining the influence of the vibration on the filtration process, identical prerequisites were provided at the filter in each case. The filter was freshly deposited with the same diatomite mixture for the standard brew and for the brew that had been subjected to a shaking process in accordance with the disclosure. As main value, the process control system 11 controlled the flow of the filtrate at the filter outlet. The amount of diatomite to the dosage was stored in the process control system as set value and is variable.

FIG. 4 shows the corresponding parameters of filtration. The results are extremely surprising. As concerns the brews with shaking process, the process control system 11 can maintain the flow at a high volume flow rate of for example 330 hl/h nearly to the end of filtration. The flow of the standard brew without shaking process already falls after a few minutes and continuously decreases until the end of the process. The diatomite dosage of the diatomite mixture is clearly lower in the brew according to the disclosure that was shaken. The increase of the pressure difference at the filter in the standard brew without shaking process was essentially steeper. Here, a difference of 2.9 bar was recorded at the end of filtration. With the brew that was shaken according to the disclosure, the pressure difference at the filter was only 1.9 bar.

The filterability of the beer considerably improved by the employment of the vibration element 3.

In the following table, the diatomite consumption is shown for a normal filtration process and for a filtration process according to the disclosure.

TABLE 1

|  | Standard brew without shaking process | Brew with shaking |
| --- | --- | --- |
| Filtered amount (hl) | 2940 | 2964 |
| Dosage agent added over 7.5 hours (l) | 1600 | 1137.5 |
| Diatomite consumption total (kg) | 430* | 350* |
| Kieselguhr (Diatomite) consumption per hl of filtrate (g/hl) | 146 | 118 |

*with pre-coating of 90 kg

As can be taken from the table, the diatomite consumption could be reduced in this test from 430 to 350 kg by the method according to the disclosure with approx. the same filtered quantity, corresponding to a saving of about 20% of diatomite. That means that the diatomite consumption per hl of filtrate can be reduced from 146 g/hl to 118 g/hl.

I claim:

1. Method for filtering beer, comprising guiding the beer to be produced into a filter as nonfiltrate, and subjecting the beer to be produced to a shaking process before it is introduced into the filter, and during the shaking process, introducing the beer to be produced into a container where waves are mechanically generated by means of a vibration element provided in the container, wherein the non-filtered beer is subjected to the shaking process during a brewing house process and before a fermentation process, and wherein, after the shaking process, the beer to be produced is subjected to a wort producing process.

2. Method according to claim 1, and modulating the vibration frequency of the vibration element within a frequency range between a lower frequency and an upper frequency.

3. Method according to claim 2, wherein the vibration frequency is modulated sinusoidally.

4. Method according to claim 2, and modulating the vibration frequency with a phase duration within a range of from 0.1 to 5 minutes.

5. Method according to claim 2, wherein the frequency range is within a total frequency range of from 30 to 220 Hz.

6. Method according to claim 2, wherein the lower frequency is 90 Hz and the upper frequency is 120 Hz.

7. Method according to claim 2, wherein the difference between the upper and the lower frequencies is between 10 and 50 Hz.

8. Method according to claim 1, wherein the nonfiltrate is filtered through a precoat filter.

9. Method according to claim 1, wherein the beer is filtered as nonfiltrate after the fermentation process for the beer clarification.

10. Method at least according to claim 1, wherein the beer to be produced is shaken with at least two vibration elements.

11. Method according to claim 4, wherein the phase duration is within a range of from 1 to 3 minutes.

12. Method according to claim 8, wherein the precoat filter is one of a filter cartridge or a membrane filter.

13. Method according to claim 10, wherein the beer to be produced is shaken with one of at least three or four vibration elements.

* * * * *